US009386679B2

(12) United States Patent
Bauer et al.

(10) Patent No.: US 9,386,679 B2
(45) Date of Patent: Jul. 5, 2016

(54) APPARATUS AND METHOD OF ALIGNING AND SECURING COMPONENTS OF A LIQUID COOLED PLASMA ARC TORCH USING A MULTI-THREAD CONNECTION

(71) Applicant: LINCOLN GLOBAL, INC., City of Industry, CA (US)

(72) Inventors: Johnathan J. Bauer, Charleston, SC (US); Lloyd D. Smyly, Walterboro, SC (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 285 days.

(21) Appl. No.: 13/956,246

(22) Filed: Jul. 31, 2013

(65) Prior Publication Data

US 2015/0034611 A1 Feb. 5, 2015

(51) Int. Cl.
*B23K 10/00* (2006.01)
*H05H 1/28* (2006.01)
*H05H 1/34* (2006.01)

(52) U.S. Cl.
CPC . *H05H 1/28* (2013.01); *H05H 1/34* (2013.01); *H05H 2001/3436* (2013.01)

(58) Field of Classification Search
CPC ............. H05H 1/28; H05H 1/26; H05H 1/34; H05H 2001/3436; B23K 10/00; B23K 9/285
USPC ........ 219/121.49, 121.52, 75, 121.48, 121.59
See application file for complete search history.

(56) References Cited

U.S. PATENT DOCUMENTS 4,967,055 A 10/1990 Raney et al.
5,105,061 A 4/1992 Blankenship et al.
5,278,388 A * 1/1994 Huang .................. B23K 10/00 219/121.45
5,414,237 A 5/1995 Carkhuff
5,440,094 A 8/1995 Zapletal et al.
5,464,962 A 11/1995 Luo et al.
5,601,734 A 2/1997 Luo et al.
5,695,662 A 12/1997 Couch, Jr. et al.
5,756,959 A 5/1998 Freeman et al.
5,767,478 A 6/1998 Walters
5,841,095 A 11/1998 Lu et al.
5,886,315 A 3/1999 Lu et al.
5,961,264 A * 10/1999 Postadan ............... F16B 37/041 411/174
5,977,510 A 11/1999 Lindsay et al.
5,994,663 A 11/1999 Lu
6,020,572 A 2/2000 Marner et al.

(Continued)

FOREIGN PATENT DOCUMENTS

EP 249238 A2 12/1987
EP 941018 A2 9/1999

OTHER PUBLICATIONS

International Application No. PCT/IB2014/001353, International Search Report & Written Opinion, 12 pages, Nov. 25, 2014.

(Continued)

*Primary Examiner* — Mark Paschall

(74) *Attorney, Agent, or Firm* — Perkins Coie LLP

(57) ABSTRACT

An arc torch assembly or sub assembly having improved replacement and centering characteristics, where certain components of the torch head have particular characteristics which improve the operation, use and replaceability of the various components. Other embodiments utilize a thread connection which employs multiple separate and distinct thread paths to secure the threaded connections.

20 Claims, 5 Drawing Sheets

(56) References Cited

U.S. PATENT DOCUMENTS

| | | | | |
|---|---|---|---|---|
| 6,066,827 | A | 5/2000 | Nemchinsky | |
| 6,084,199 | A | 7/2000 | Lindsay et al. | |
| 6,114,650 | A | 9/2000 | Marner et al. | |
| 6,130,399 | A | 10/2000 | Lu et al. | |
| 6,207,923 | B1 | 3/2001 | Lindsay et al. | |
| 6,403,915 | B1 | 6/2002 | Cook et al. | |
| 6,423,922 | B1 | 7/2002 | Nemchinsky et al. | |
| 6,424,082 | B1 | 7/2002 | Hackett et al. | |
| 6,452,130 | B1 | 9/2002 | Qian et al. | |
| 6,464,034 | B1 * | 10/2002 | Toda | B62D 5/0448 180/444 |
| 6,483,070 | B1 | 11/2002 | Diehl et al. | |
| 6,614,001 | B2 | 9/2003 | Hackett et al. | |
| 6,686,559 | B1 | 2/2004 | Walters et al. | |
| 6,841,754 | B2 | 1/2005 | Cook et al. | |
| 6,946,617 | B2 | 9/2005 | Brandt et al. | |
| 6,969,819 | B1 | 11/2005 | Griffin et al. | |
| 7,019,255 | B2 | 3/2006 | Brandt et al. | |
| 7,081,597 | B2 | 7/2006 | Severance, Jr. et al. | |
| 7,193,174 | B2 | 3/2007 | Brandt et al. | |
| 7,256,366 | B2 | 8/2007 | Severance et al. | |
| 7,375,302 | B2 | 5/2008 | Twarog et al. | |
| 7,375,303 | B2 | 5/2008 | Twarog et al. | |
| 7,423,235 | B2 | 9/2008 | Severance, Jr. et al. | |
| 7,435,925 | B2 | 10/2008 | Griffin et al. | |
| 7,598,473 | B2 | 10/2009 | Cook et al. | |
| 7,605,340 | B2 | 10/2009 | Duan et al. | |
| 7,659,488 | B2 | 2/2010 | Cook et al. | |
| 7,754,993 | B2 | 7/2010 | Ortega et al. | |
| 7,829,816 | B2 | 11/2010 | Duan et al. | |
| 7,989,727 | B2 | 8/2011 | Twarog et al. | |
| 8,035,055 | B2 | 10/2011 | Twarog et al. | |
| 8,089,025 | B2 | 1/2012 | Sanders et al. | |
| 8,097,828 | B2 | 1/2012 | Roberts et al. | |
| 8,101,882 | B2 | 1/2012 | Mather et al. | |
| D654,104 | S | 2/2012 | Fitzpatrick et al. | |
| 8,115,136 | B2 | 2/2012 | Mather et al. | |
| 8,153,927 | B2 | 4/2012 | Twarog et al. | |
| 8,212,173 | B2 | 7/2012 | Liebold et al. | |
| 8,304,684 | B2 | 11/2012 | Smith et al. | |
| 8,338,740 | B2 | 12/2012 | Liebold et al. | |
| 8,389,887 | B2 | 3/2013 | Currier et al. | |
| 8,395,077 | B2 | 3/2013 | Duan et al. | |
| 8,525,069 | B1 | 9/2013 | Mather et al. | |
| 8,541,712 | B2 | 9/2013 | Mather et al. | |
| D692,402 | S | 10/2013 | Dalton et al. | |
| 8,546,718 | B2 | 10/2013 | Mather et al. | |
| 8,546,719 | B2 | 10/2013 | Warren, Jr. et al. | |
| 8,581,139 | B2 | 11/2013 | Severance, Jr. et al. | |
| 8,633,417 | B2 * | 1/2014 | Ashtekar | H05H 1/28 219/119 |
| 8,698,036 | B1 | 4/2014 | Kornprobst et al. | |
| 8,759,709 | B2 | 6/2014 | Mather et al. | |
| 8,772,667 | B2 | 7/2014 | Yang et al. | |
| 8,829,385 | B2 | 9/2014 | Yang et al. | |
| 2003/0100208 | A1 | 5/2003 | Conway et al. | |
| 2003/0116522 | A1 * | 6/2003 | Julian | B65D 1/023 215/252 |
| 2004/0200810 | A1 | 10/2004 | Brandt et al. | |
| 2010/0155373 | A1 | 6/2010 | Yamaguchi et al. | |
| 2012/0031881 | A1 | 2/2012 | Griffin et al. | |
| 2013/0306607 | A1 | 11/2013 | Mather et al. | |
| 2014/0021175 | A1 | 1/2014 | Chen et al. | |
| 2014/0110382 | A1 | 4/2014 | Beliveau et al. | |

OTHER PUBLICATIONS

International Application No. PCT/IB2014/001354, International Search Report & Written Opinion, 11 pages, Nov. 19, 2014.

International Application No. PCT/IB2015/000297, International Search Report & Written Opinion, 11 pages, Jun. 8, 2015.

* cited by examiner

APPARATUS AND METHOD OF ALIGNING AND SECURING COMPONENTS OF A LIQUID COOLED PLASMA ARC TORCH USING A MULTI-THREAD CONNECTION

TECHNICAL FIELD

Devices, systems, and methods consistent with the invention relate to cutting, and more specifically to devices, systems and methods for aligning and securing components of a liquid cooled plasma arc torch.

BACKGROUND

In many cutting operations, plasma arc torches are utilized. These torches operate at very high temperatures which can damage many components of the torches. As such, some torches use liquid cooling to transfer the heat away from some of the cutting torch components. The cooling liquid is passed through various fluid chambers, etc. However, the presence and need for these chambers and passages means that alignment of some of the components of the torch assembly can be difficult, especially when components are replaced. When installation alignment is poor the performance of the cooling can be adversely affected and thus the usable life of the torch and torch components can be greatly diminished. Some torches have added various stabilizing portions on some of the components that extend into the cooling fluid paths, however these stabilizing portions can interfere with fluid flow and thus compromise the cooling abilities of the torch assembly.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is an arc torch assembly or sub assembly having improved replacement and centering characteristics, where certain components of the torch head have particular characteristics which improve the operation, use and replaceability of the various components. Other embodiments utilize a thread connection which employs multiple separate and distinct thread paths to secure the threaded connections.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Figure 1:
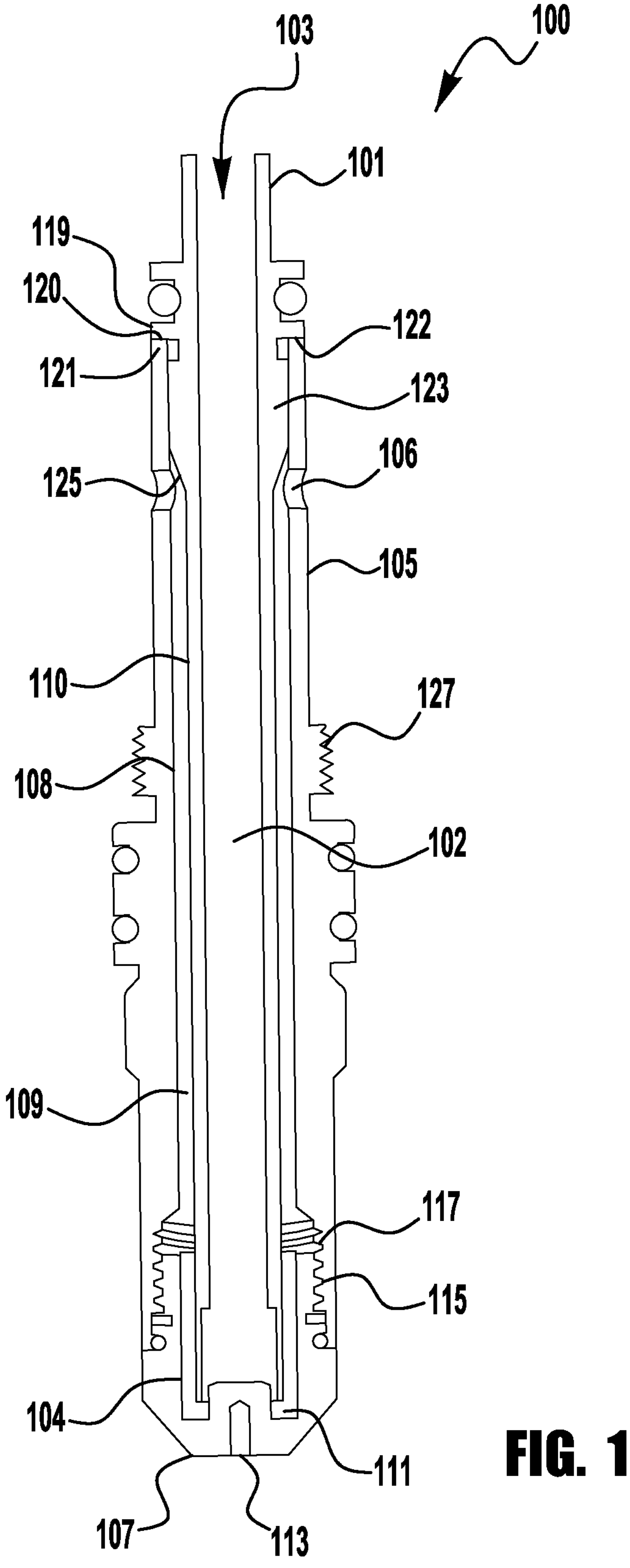
FIG. 1 illustrates an exemplary embodiment of a cutting torch coolant tube assembly of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts a diagrammatical representation of an exemplary embodiment of a cutting torch cooling tube electrode assembly 100 of the present invention. As is generally understood, the assembly 100 is inserted into a torch body which is not shown here for clarity (see FIG. 4). The assembly 100 comprises a coolant tube 101 which is inserted into a channel 109 of a coolant tube holder 105 and a channel 104 of an electrode 107. The distal end of the coolant tube holder 105 has an opening into which the electrode 107 is inserted. The proximate end of the holder 105 also has an opening into which the coolant tube 101 is inserted, as shown.

The coolant tube 101 has a proximate end opening 103 which feeds into a channel 102 in the coolant tube. During operation, the cooling liquid is directed to the opening 103 and down through the channel 102 towards the distal end of the coolant tube 101. The tube 101 has a length such that its distal end creates a gap 111 between the end of the tube 101 and an inner wall of the channel 104 of the electrode 107. This gap 111 is important to the operation of the assembly 100 as the coolant flows down the channel 102 it passes through this gap 111 and enters the channel 104 of the electrode 107 and then the channel of the holder 105 to provide the desired cooling. Maintaining a consistent width of the gap 111 is important to proper coolant flow and in many known torch assemblies this is difficult to do, particularly when the electrode and/or coolant tube of prior torches is replaced. Because of the structure of known torches it is difficult to assemble the components to achieve the desired gap 111 dimension when replacing any of the components. This results in diminished cooling performance. Embodiments of the present provide for very consistent insertion of the tube 101 and the gap 111 dimension, as well as centering of the tube 101 in the channels 109 and 104, which will be described in more detail below.

Once the coolant passes through the gap 111 it is directed through the channel 109 towards the proximate end of the holder 105 between the outer surface 110 of the tube 101 and the inner surface 108 of the holder 105. In embodiments of the present invention, the holder 105 contains a plurality of exit ports 106 which allows the coolant to exit the channel 109 and transfer heat away from assembly 100. The ports 106 are positioned radially around a centerline of the holder 105 so that the coolant exits radially away from the holder 105 centerline as opposed to out of its proximate end. In exemplary embodiments, the holder 105 contains between 3 and 8 ports. The radial displacement of the ports is symmetrical to ensure even flow. The diameter of the ports is to be selected to ensure that the desired coolant flow is achieved during operation. In some exemplary embodiments all of the ports 106 have the same diameter. However, in other exemplary embodiments, the ports 106 can have different diameters. For example, half of the ports 106 can have a first diameter, while the other half of the ports 106 can have a second diameter which is less than the first diameter. Once the coolant exits the ports 106 it is recycled through a heat exchange and/or cooling system as is generally known and understood. Further, in some exemplary embodiments the ports have a circular opening, while in other exemplary embodiments, at least some of the ports 106 can have non-circular shapes like slots, etc. After cooling the electrode the coolant recirculates through the ports to a heat exchanger (not shown for clarity).

Figure 2:
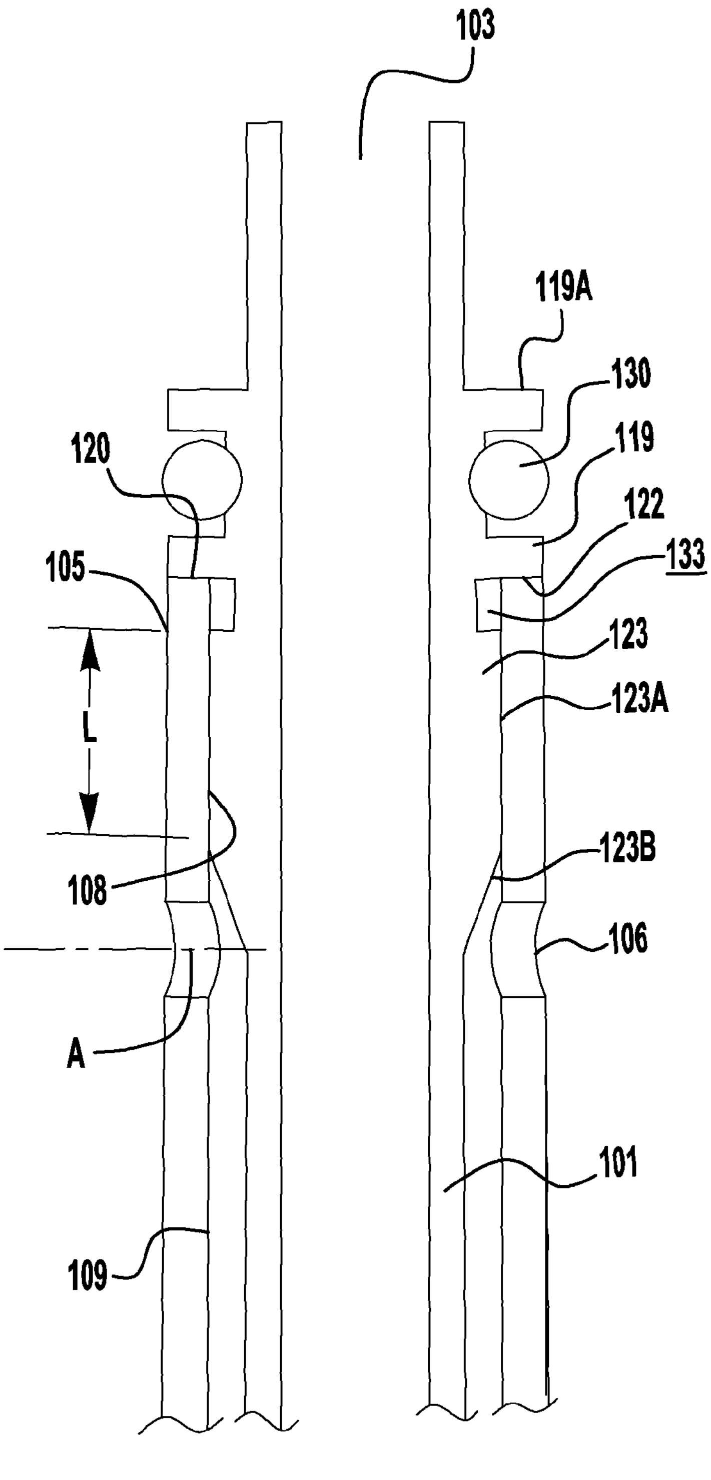
FIG. 2 illustrates an another view of the cutting torch coolant tube of FIG. 1.

FIG. 2 shows a close up view of the proximate end of the coolant tube holder 105 and the coolant tube 101, which shows how the coolant tube 101 is stabilized and centered in the coolant tube holder 105. As shown, the coolant tube 101 has a stabilization portion 123 which extends radially around the tube 101. The stabilization portion 123 has an outer land surface 123A which engages with the inner surface 108 of the holder 105. When the tube 101 and the holder 105 are engaged with each other there is a friction fit engagement between the portion 123 and the surface 108. The friction fit engagement between the portion 123 and the surface 108 holds the tube 101 centered in the channel 109 and ensures that each time the cooling tube, and other components are replaced the components are repositioned in a centered state with little difficulty. In exemplary embodiments, the portion 123 is configured such that the friction fit engagement with the holder 105 is continuous radially around the surface 108. Stated differently, the engagement between the portion 123 and surface 108 is such that not fluid (cooling fluid, etc.) can pass between the portion 123 and the surface 108. Thus, it is easier to replace the components, including the assembly 100 in a torch and providing more consistent accurate replacement.

Figure 2A:
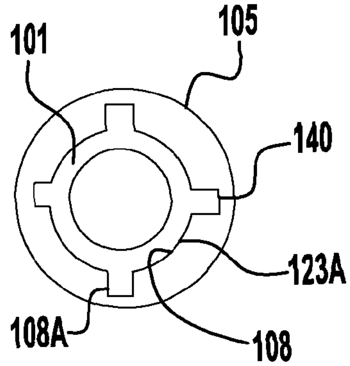
FIGS. 2A and 2B illustrate a similar view of that shown in FIG. 2, but of a different exemplary embodiment.
Figure 2B:
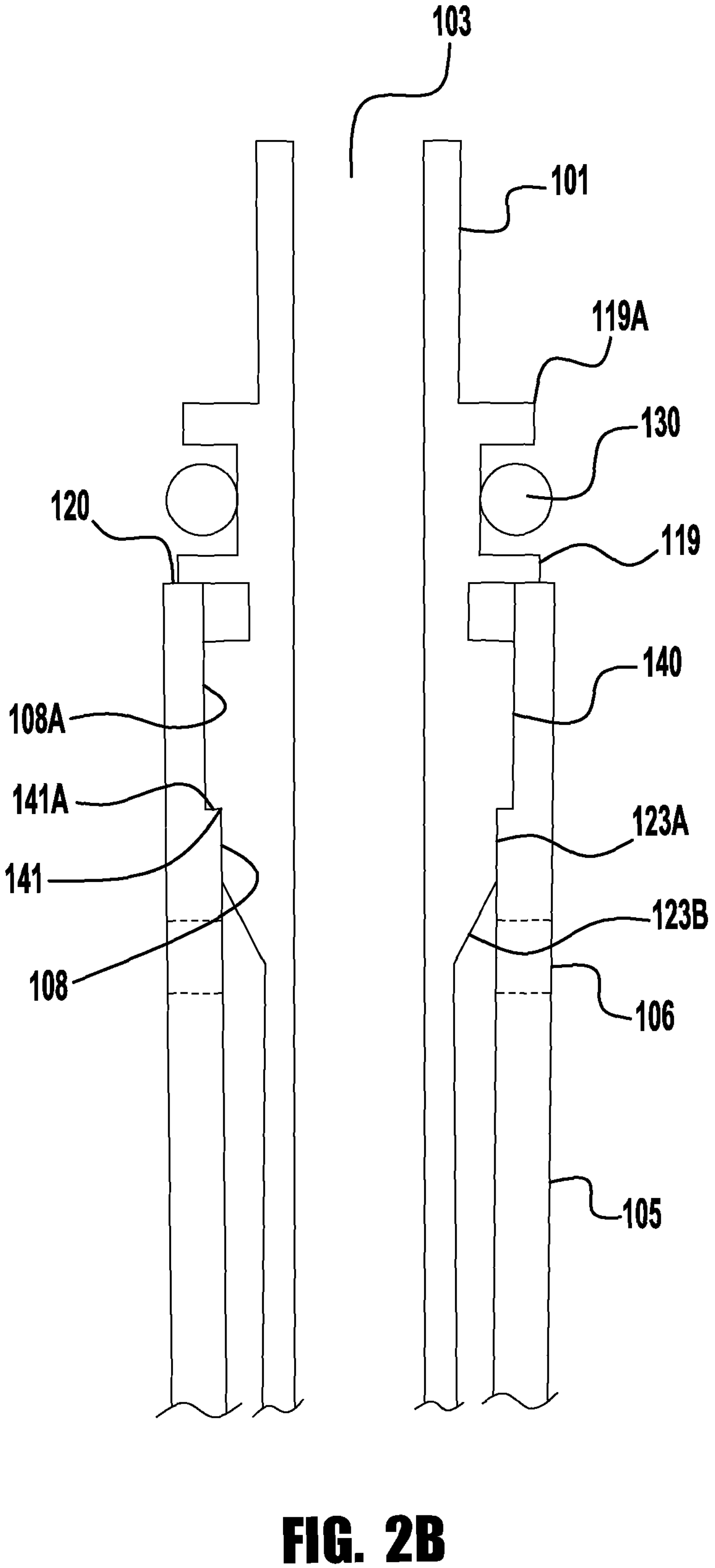

Another exemplary embodiment of the present invention, is shown in FIGS. 2A and 2B, where the coolant tube 101 has extension portions 140 which extend radially outward from the portion 123 as shown. These extension portions 140 extend out from portion 123 into grooves 108A in the coolant tube holder 105 and aide to ensure proper insertion into the coolant tube holder 105. In exemplary embodiments the extension portions 140 have a friction fit with the grooves 108A. This engagement aids in centering the coolant tube 101 as well as ensuring that the coolant tube 101 is oriented radially in the proper position. In exemplary embodiments, the extension portions 140 have a length which is less than the length L of the portion 123. Further, the extension portions have a surface 141 which engages with an adjacent surface 141A on the coolant tube holder 105. The engagement of these two surfaces acts to again ensure proper placement of the coolant tube 101 in the coolant tube holder 105 and ensure that it is not inserted too far into the holder 105. Although four portions 140 are shown in FIGS. 2A and 2B, other embodiments can use a different number of portions 140.

In lieu of various aspects of the above described invention, the coolant tube 101 will always be inserted in a concentric state in its holder 105. Thus preventing improper insertion and decreased component life.

Additionally, as shown the tube 101 has securing portion 119, which is closer to the proximal end of the tube than the stabilization portion 123, which is used in conjunction with a third portion 119A to hold an o-ring 130 in place. The o-ring 130 is used to provide a seal for the assembly 100 and tube 101 when installed in a torch assembly. Each of the securing portion 119 and the third portion 119A extended radially around the tube 101. The securing portion 119 has a distal surface 122 which, when installed in the holder 105, engages with a the proximal end surface 120 of the holder 105. Because of this engagement, the insertion of the tube 101 into the holder 105 will always be made at the appropriate position to ensure that the gap 111 is the proper distance. In known torch assemblies the depth of insertion is difficult to repeat or perform consistently. Thus, the surfaces 122 and 120 ensure that the tube 101 is inserted to the proper distance easily and nearly eliminates error during replacement and assembly. Further, the combination of having the surface 122 engage with the surface 120 at the proximal end of holder 105 and the portion 123 engaging with the surface 108 provides a coolant tube assembly 100 with improved centricity and improved reliability during assembly and replacement of components over known torches. The combination of these engagements in close proximity to each other ensures that the tube 101 is inserted into the holder 105 at the proper depth for the gap 111 and centered within the channel 109. Further, this configuration allows the tube 101 to be configured without positional protrusions closer to the distal end of the tube 101. In some known torch assemblies the coolant tube has protrusions positioned closer to the distal end of the tube to aid in centering the tube. However, these protrusions extend into the coolant flow path and thus impede coolant flow and coolant performance. Some exemplary embodiments of the present invention can use positional protrusions, but because of the advantages of the above discussed configuration the protrusions can be smaller, and in many applications are not necessary.

Also as shown in FIG. 2, exemplary embodiments of the present invention include an undercut portion 133 positioned between portions 119 and 123. This undercut portion serves to ensure proper seating between surfaces 122 and 120 and thus the coolant tube 101 in the coolant tube holder 105. This undercut portion 133 is to have a length along the coolant tube which is less than the length L of the portion 123.

As described above, the stabilization portion 123 aids in stabilizing the tube 101 when inserted into the holder 105 in a press fit state. Thus, the length of the portion 123 needs to be sufficient to provide the desired stabilization and ensure centricity when inserted. To achieve this, in exemplary embodiments of the present invention, the outermost plateau surface 123A of the portion 123 has a length L that is in the range of 10 to 20% of the length of the tube 101 which is inserted into the holder 105 (the length of the tube from its distal end at the gap 111). Having a plateau length in this range ensures sufficient alignment and stability while also allowing for accurate and repeatable positioning. In other exemplary embodiments the length of the plateau portion 123A is in the range of 4 to 25% of the length of the tube 101 within the holder 105. The plateau length L described above is the length of the flat surface on the portion 123 that makes contact with the inner surface of the holder 105 when the tube is inserted into the holder 105.

As also shown in FIG. 2, the portion 123 has an angled surface 123B which extends from the body of the tube 101 to the plateau surface 123A. The angled surface 123B aids in guiding the flow of the coolant fluid out of the ports 106. This aids in preventing the creation of stagnation zones in the fluid flow and increases the performance of the fluid flow. In some exemplary embodiments, the angle A between the body of the tube 101 and the surface 123B is in the range of 16 to 60 degrees. In other exemplary embodiments the angle is in the range of 40 to 60 degrees. Further, as shown in FIG. 2, the center of the angle A is positioned such that it aligns with the centerline of the ports 106. If the angle A is a radiused angle A, as in some exemplary embodiments, then the center A corresponds to the center of a circle defined by the radius of the angle A, whereas if the angle A is a sharp angle then the center of the angle A is the inflection point. In some exemplary embodiments, the center of the angle A is aligned with the centerline of the ports 106. In other exemplary embodiments, the centerline of the angle A is positioned such that it is close to the centerline of the ports 106, but does not have to be aligned with the centerline. In such embodiments, the center of the angle A is positioned within 10% of the diameter of the ports 106 with respect to the centerline of the ports 106. For example, if the diameter of the ports 106 is 0.25", the center of the angle A is aligned within +/−0.025" of the centerline of the ports. If the ports have varying diameters (as referenced previously) the average of the port diameters is to be used to determine the range of alignment as described above.

As shown in FIG. 1, the electrode 107 is shorter and threaded into the coolant tube assembly. Such a configuration allows the electrode 107 to be considerably smaller and much easier to be replaced. Because of this configuration, in exemplary embodiments of the present invention, the electrode 107 can have a length (form its most distal to most proximate ends) that is within the range of 4 to 20% of the coolant tube assembly 100, 5 to 20% of the length of the coolant tube 101, and within the range of 5 to 20% the length of the coolant tube holder 105. With these ratios, embodiments of the present invention provide excellent cutting performance and at the same time allow for ease of replacement and alignment of each of the respective components, as described herein. That is, when a component such as the electrode 107 need be replaced, the fit and construction of the assembly of the holder 105 and tube 101 (which can be replaced as a single unit) ensures proper replacement. Further, it is not necessary to remove the coolant tube holder and thus risk misaligning the coolant tube holder or the remainder of the assembly 100 when replacement of the electrode 105 is needed. Additionally, the coolant tube holder 105 and the coolant tube 101 can be kept as an assembly to be replaced as needed which ensures that the assembly The electrode 107 can be made of known materials used for electrodes, including but not limited to copper, silver, etc. Further, because of the reduced size of the electrode 107 there is a significant reduction in cost by just replacing the electrode 107 of the present invention.

Figure 3:
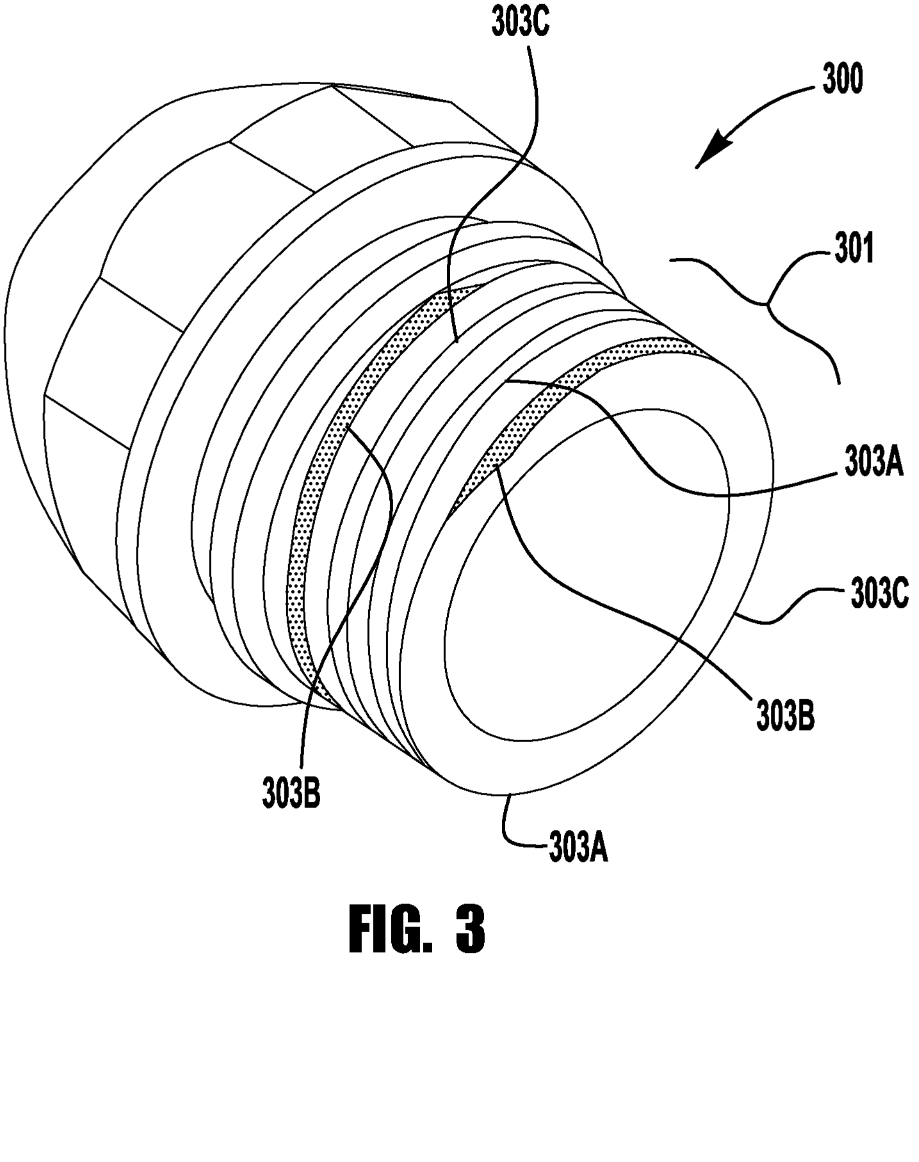
FIG. 3 illustrates an exemplary embodiment of an thread pattern that can be used with various components of the present invention.

FIG. 3 depicts another aspect of the present invention, which aids in ensuring proper alignment and centricity during assembly and replacement of components of the assembly 100. Specifically, FIG. 3 depicts a quick-coupling, multi-start thread configuration which is used on various components of the torch assembly 100, and can be used on other components of a torch. As described more fully below, the thread design employs multiple starts and a modified thread pitch to enhance alignment and installation, during assembly and replacement.

As described previously, it is often necessary to remove and replace worn components of a cutting torch. Because of the need to replace components often it is desirable to speed up the process while at the same time ensuring that the replaced components are properly installed and aligned. Known torch assemblies use a standard single thread design, and some have used a bayonet thread design. However, these thread designs often require an appreciable number of turns to complete the installation, and increase the likelihood of an error during threading, such as cross-threading. For example, in most applications replacement of threaded components can require anywhere from 5 to 10 full turns of the item. By having such large number of turns for a component there is an increased likelihood of cross-threading the component, and/or result in the component not being completely tightened which can result in leaks and/or poor component life. Embodiments of the present invention address these issues by using a multi-thread design which utilizes existing required installation torque and thread stresses while maintaining the same applied force to mating parts as known thread systems.

Figure 4:
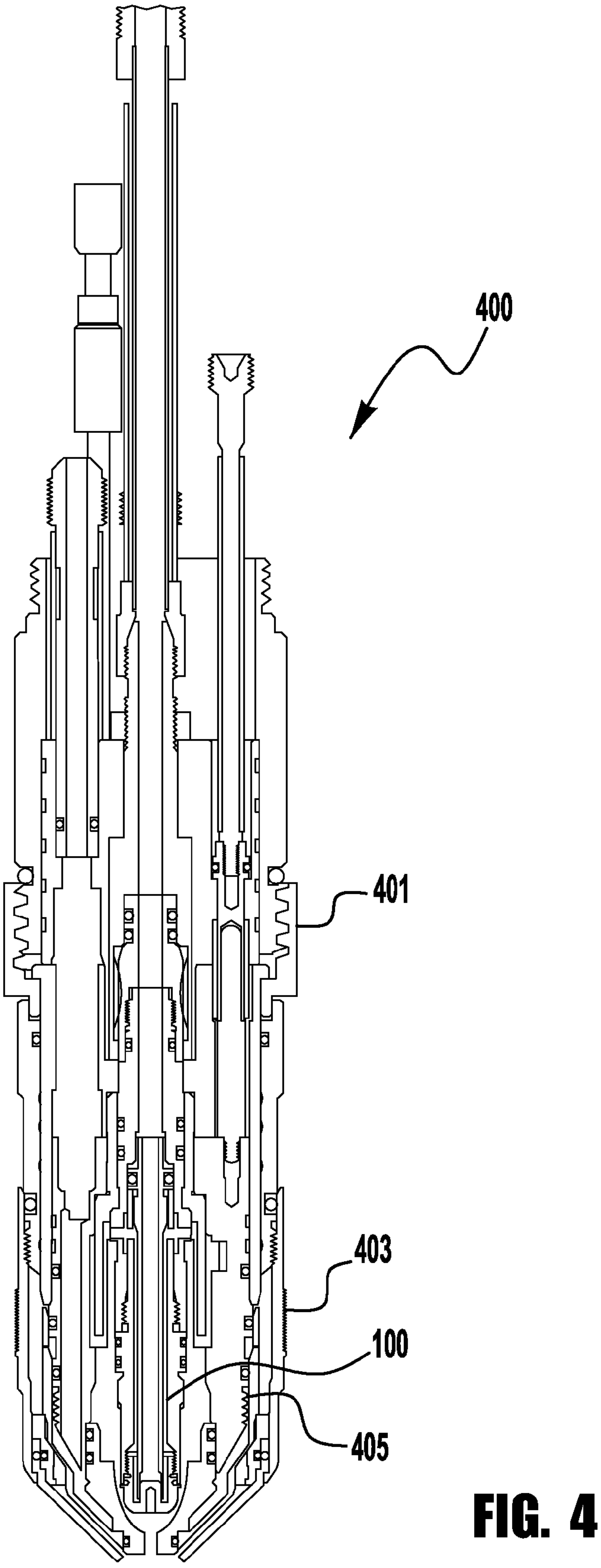
FIG. 4 illustrates an exemplary embodiment of a torch assembly utilizing the assembly of FIG. 1.

FIG. 3 depicts an exemplary embodiment of an electrode 300 having a multi-thread design of the present invention. Specifically, the electrode 300 has a thread portion 301 having a plurality of separate and distinct thread paths 303A, 303B and 303C. The embodiment shown has three distinct thread paths 303, but other embodiments of the present invention can use more than three thread paths. For example, other exemplary embodiments can use 4 distinct thread paths, and others can use as many as 5 different thread paths. By using multiple thread paths, embodiments of the present invention can provide easy and accurate replacement of components, greatly minimizing misalignment and/or cross-threading of components, while at the same time providing the required and desired applied connection force. Embodiments of the present invention, also deliver the desired mating force by using significantly less complete rotations of the component, thus making the replacement of a component quicker and more consistent. For example, embodiments of the present invention can provide the complete installation of a component with only 1 to 2 complete rotations of a component. In some exemplary embodiments, complete installation of a component can be achieved by 1.25 to 1.5 complete rotations of the component. For example, in certain applications electrodes of the present invention can be installed with only 1.25 to 1.5 complete rotations. By using such a low number of rotations to complete an installation, the chances of accurate and complete installation are greatly increased Thus, embodiments of the present invention can provide highly accurate installation by ensuring proper alignment, minimizing the chances of cross threading or misalignment and ensuring that the component (for example the electrode 107) is fully installed. By reducing the number of rotations required to install a component, embodiments of the present invention make it much easier on an installer to ensure that complete installation has been achieved. Because of the advantages of the present invention, the multi-thread configuration can be used on all components of a torch head assembly that utilize threads, and in particular those threads on components that are frequently replaced. For example, each of the threads 115, 117 and 127 shown in FIG. 1 can have the multi-thread configuration as described above. Further, in addition to these components, embodiments can also use this thread configuration on other torch assembly components, such as quick disconnect rings, inner and outer retaining caps, electrodes, coolant tubes, holders, etc. As shown in FIG. 4, the torch attachment ring 401 connects the torch head to the torch base, the outer retaining cap 403 aids in retaining the torch shield cap and the inner retaining cap 405 aids in retaining the torch nozzle.

FIG. 4 depicts an exemplary embodiment of a torch assembly 400 that contains the assembly 100 from FIG. 1. Because the other components of the torch assembly 400 are generally known, they are not discussed in detail herein. Of course, various embodiments of the present invention are not limited to the configuration of the torch assembly 400 as shown in FIG. 4, or the assembly 100 as shown in FIGS. 1 and 2, and these embodiments are intended to be exemplary.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A coolant tube assembly for a torch, comprising:

a coolant tube holder having a distal end and a proximate end, each of said ends having an opening to create a channel in said coolant tube holder, where said coolant tube holder channel has an inner surface; and a coolant tube inserted into said channel of said coolant tube holder, where said coolant tube is inserted into said opening at said proximate end of said coolant tube holder, where said coolant tube has a distal end and a proximate end and each of said ends of said coolant tube has an opening to create a channel in said coolant tube;

wherein said coolant tube further comprises a stabilization portion which extends radially around said coolant tube and said stabilization portion has an outer surface which engages with said inner surface of said coolant tube holder and said engagement centers said coolant tube in said coolant tube holder, where said engagement is a sealed engagement such that no fluid can pass by said stabilization portion when engage with said inner surface of said coolant tube holder;

wherein said coolant tube further comprises a securing portion which is closer to said proximate end of said coolant tube than said stabilization portion, said securing portion has a distal surface which engages with an end surface on said proximate end of said coolant tube holder;

wherein said coolant tube holder further comprises a plurality of exits ports, where said exits ports are positioned closer to the distal end of said coolant tube holder than said engagement between said stabilization portion and said coolant tube holder and said exit ports are in communication with said coolant tube holder channel;

wherein said coolant tube comprises an undercut portion between said stabilization portion and said securing portion creating a gap between said inner surface of said coolant tube holder and said coolant tube; and wherein said coolant tube holder further comprises a first threaded portion at its distal end and a second threaded portion on an outer surface of said coolant tube holder, where at least one of said first and second threaded portions have at least three separate and distinct thread paths, where each of said multiple separate and distinct thread paths are disposed and running adjacent to each other and are utilized by said at least one threaded connection.

2. The coolant tube assembly of claim 1, wherein said at least one threaded portion having said at last three threads is said first threaded portion and an electrode is coupled to said first threaded portion, said electrode having at least three separate and distinct thread paths which match with said at least three separate and distinct thread paths of said first threaded portion to secure said electrode.

3. The coolant tube assembly of claim 2, wherein the number of rotations of said electrode to fully install said electrode with respect to said coolant tube holder is in the range of 1 to 2.

4. The coolant tube assembly of claim 2, wherein the number of rotations of said electrode to fully install said electrode with respect to said coolant tube holder is in the range of 1.25 to 1.5.

5. The coolant tube assembly of claim 2, wherein said first threaded portion is on an inner surface of said coolant tube holder.

6. The coolant tube assembly of claim 2, wherein said second threaded portion has at least three separate and distinct thread paths to engage said coolant tube assembly into a torch assembly, and where the number of rotations of said coolant tube assembly to fully install said coolant tube assembly with respect to said torch assembly is in the range of 1 to 2.

7. The coolant tube assembly of claim 2, wherein said second threaded portion has at least three separate and distinct thread paths to engage said coolant tube assembly into a torch assembly, and where the number of rotations of said coolant tube assembly to fully install said coolant tube assembly with respect to said torch assembly is in the range of 1.25 to 1.5.

8. The coolant tube assembly of claim 1, wherein said outer surface of said stabilization portion which engages with said inner surface of said coolant tube holder has a length which is in the range of 4 to 25% of the length of the coolant tube which is inserted into the coolant tube holder.

9. The coolant tube assembly of claim 1, wherein a distal end of said stabilization portion comprises an angled surface from said coolant tube to said outer surface of said stabilization portion, and said angled surface having an angle between its surface and the coolant tube in the range of 16 to 60 degrees.

10. A cutting torch comprising the coolant tube assembly of claim 1.

11. A coolant tube assembly for a torch, comprising:

a coolant tube holder having a distal end and a proximate end, each of said ends having an opening to create a channel in said coolant tube holder, where said coolant tube holder channel has an inner surface; and a coolant tube inserted into said channel of said coolant tube holder, where said coolant tube is inserted into said opening at said proximate end of said coolant tube holder, where said coolant tube has a distal end and a proximate end and each of said ends of said coolant tube has an opening to create a channel in said coolant tube;

wherein said coolant tube further comprises a stabilization portion which extends radially around said coolant tube and said stabilization portion has an outer surface which engages with said inner surface of said coolant tube holder and said engagement centers said coolant tube in said coolant tube holder, where said engagement is a sealed engagement such that no fluid can pass by said stabilization portion when engage with said inner surface of said coolant tube holder;

wherein said coolant tube further comprises a securing portion which is closer to said proximate end of said coolant tube than said stabilization portion, said securing portion has a distal surface which engages with an end surface on said proximate end of said coolant tube holder;

wherein said coolant tube holder further comprises a plurality of exits ports, where said exits ports are positioned closer to the distal end of said coolant tube holder than said engagement between said stabilization portion and said coolant tube holder and said exit ports are in communication with said coolant tube holder channel;

wherein said coolant tube comprises an undercut portion between said stabilization portion and said securing portion creating a gap between said inner surface of said coolant tube holder and said coolant tube;

wherein said outer surface of said stabilization portion which engages with said inner surface of said coolant tube holder has a length which is in the range of 4 to 25% of the length of the coolant tube which is inserted into the coolant tube holder;

wherein a distal end of said stabilization portion comprises an angled surface from said coolant tube to said outer surface of said stabilization portion; and wherein said coolant tube holder further comprises a first threaded portion at its distal end and a second threaded portion on an outer surface of said coolant tube holder, where at least one of said first and second threaded portions have at least three separate and distinct thread paths, where each of said multiple separate and distinct thread paths are disposed and running adjacent to each other and are utilized by said at least one threaded connection.

12. The coolant tube assembly of claim 11, wherein said at least one threaded portion having said at last three threads is said first threaded portion and an electrode is coupled to said first threaded portion, said electrode having at least three separate and distinct thread paths which match with said at least three separate and distinct thread paths of said first threaded portion to secure said electrode.

13. The coolant tube assembly of claim 12, wherein the number of rotations of said electrode to fully install said electrode with respect to said coolant tube holder is in the range of 1 to 2.

14. The coolant tube assembly of claim 12, wherein the number of rotations of said electrode to fully install said electrode with respect to said coolant tube holder is in the range of 1.25 to 1.5.

15. The coolant tube assembly of claim 12, wherein said first threaded portion is on an inner surface of said coolant tube holder.

16. The coolant tube assembly of claim 12, wherein said second threaded portion has at least three separate and distinct thread paths to engage said coolant tube assembly into a torch assembly, and where the number of rotations of said coolant tube assembly to fully install said coolant tube assembly with respect to said torch assembly is in the range of 1 to 2.

17. The coolant tube assembly of claim 12, wherein said second threaded portion has at least three separate and distinct thread paths to engage said coolant tube assembly into a torch assembly, and where the number of rotations of said coolant tube assembly to fully install said coolant tube assembly with respect to said torch assembly is in the range of 1.25 to 1.5.

18. The coolant tube assembly of claim 11, wherein said outer surface of said stabilization portion which engages with said inner surface of said coolant tube holder has a length which is in the range of 10 to 20% of the length of the coolant tube which is inserted into the coolant tube holder.

19. The coolant tube assembly of claim 11, wherein said angled surface having an angle between its surface and the coolant tube in the range of 16 to 60 degrees.

20. A cutting torch comprising the coolant tube assembly of claim 11.

* * * * *